United States Patent [19]

Jacobson

[11] 4,391,315

[45] Jul. 5, 1983

[54] TIRE CHAIN WITH ATTACHING DEVICE

[76] Inventor: Gerald D. Jacobson, 1816 113 Dr. SE., Everett, Wash. 98205

[21] Appl. No.: 282,505

[22] Filed: Jul. 13, 1981

[51] Int. Cl.³ .............................................. B60C 27/00
[52] U.S. Cl. .............................. 152/213 A; 24/68 TT; 24/301; 81/15.8; 152/219; 152/242
[58] Field of Search ................... 81/15.8; 152/213 R, 152/213 A, 216, 221, 217–219, 225 R, 225 C, 239, 241, 242; 24/68 CT, 68 TT, 69 TT, 69 T, 201 HF, 369, 301; D12/154

[56] References Cited

U.S. PATENT DOCUMENTS

| | | | |
|---|---|---|---|
| 1,571,764 | 2/1926 | Edwards | 152/213 |
| 1,666,397 | 4/1928 | Piatt | 152/213 |
| 1,806,840 | 5/1931 | Campbell | 81/15.8 |
| 1,914,760 | 6/1933 | Stiles | 152/213 |
| 2,076,894 | 4/1937 | Johnson | 152/213 |
| 2,166,869 | 7/1939 | Lees et al. | 81/15.8 |
| 2,177,279 | 10/1939 | Holub | 81/15.8 |
| 2,213,910 | 9/1940 | Higgins et al. | 81/15.8 |
| 2,316,718 | 4/1943 | Royer | 81/15.8 UX |
| 2,484,714 | 10/1949 | Kapp | 152/213 |
| 2,665,602 | 1/1954 | Kent | 81/15.8 |
| 2,672,911 | 3/1954 | Bushnell | 152/213 R |
| 2,707,015 | 4/1955 | Rickenback | 152/213 |
| 2,715,429 | 8/1955 | Rockel | 152/213 |
| 2,834,391 | 5/1958 | Hellman | 152/213 |
| 2,857,136 | 10/1958 | Thomas | 152/213 |
| 2,925,843 | 2/1960 | Cox | 152/213 |
| 3,303,729 | 2/1967 | Webb et al. | 152/213 |
| 3,479,910 | 11/1969 | Jewett | 81/15.8 |

Primary Examiner—Edward C. Kimlin
Assistant Examiner—Thomas Bokan

[57] ABSTRACT

An anti-skid tire chain is improved by having a resilient strap at one end, the strap being adapted to be secured on the inside wall of a mounted tire having its tread on a road surface. On both of the side wall links of the chain, there are plates having a plurality of sharply pointed hooks or barbs adapted to be pressed into the side walls of the tire when the chain is initially being secured to the tire. In order to have the barbs securely engage the tire so as to hold the chain thereon during the rotation of the wheel and tire, the resilient strap is extended transversely on the chain from adjacent one of the plates to the other and the plates are secured to the tire by pressing them against the side walls with the barbs extending toward the tire wall and toward the tread. At the same time the strap is stretched so that when it is released, the barbs will be additionally pulled into the tire by the resilient retraction of the strap. The barbs do not damage the tire but hold the chain thereon while the tire is rotated so that the opposite ends of the chain can be brought adjacent each other and secured together. The resilient strap has a hook on its free end which is used to engage the opposite end of the inside row of chain links and secures the chain tightly by the bias of the strap on the inside wall. A typical locking link is used on the outside wall to secure the outside row of links thereon.

5 Claims, 7 Drawing Figures

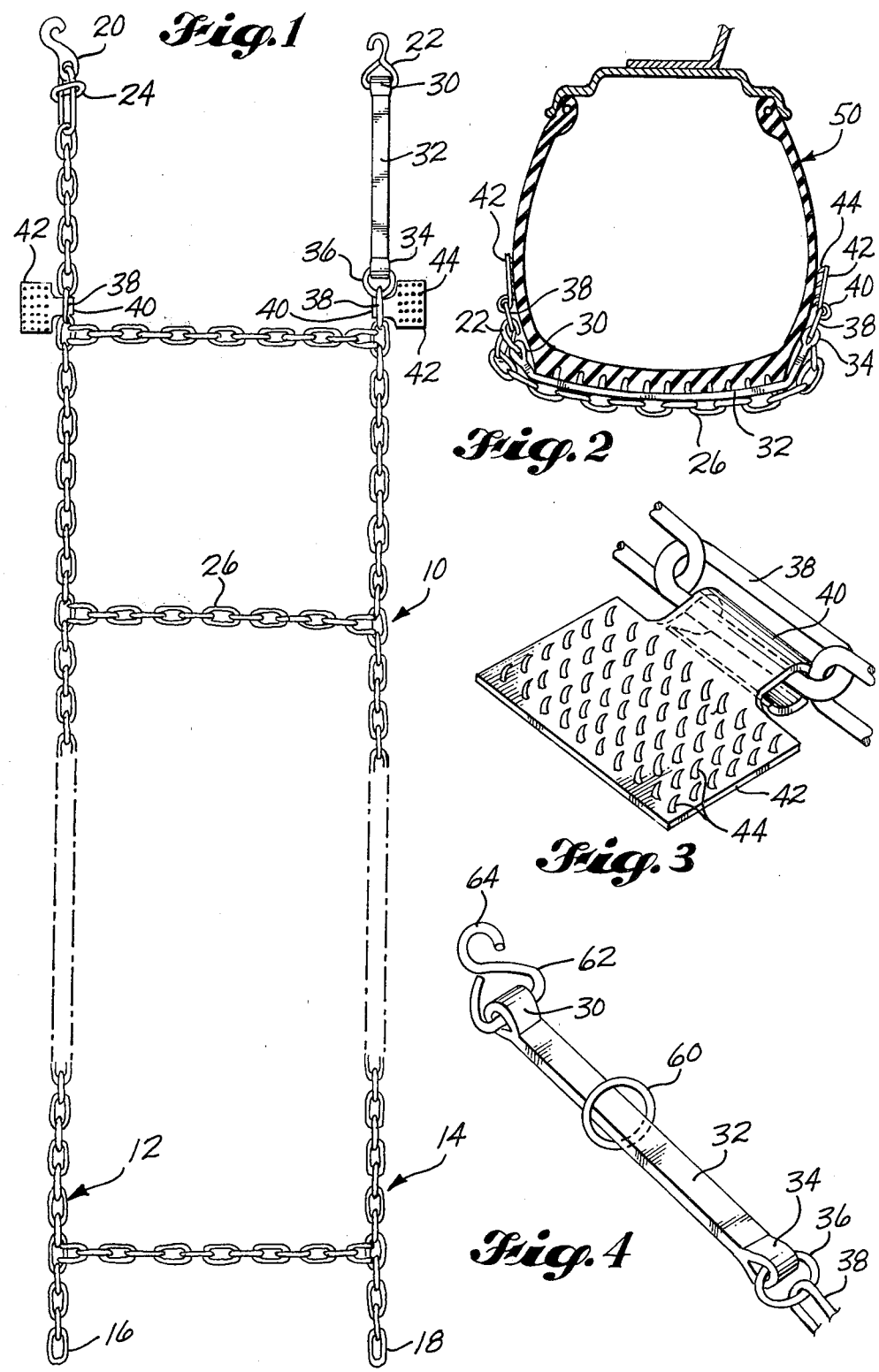

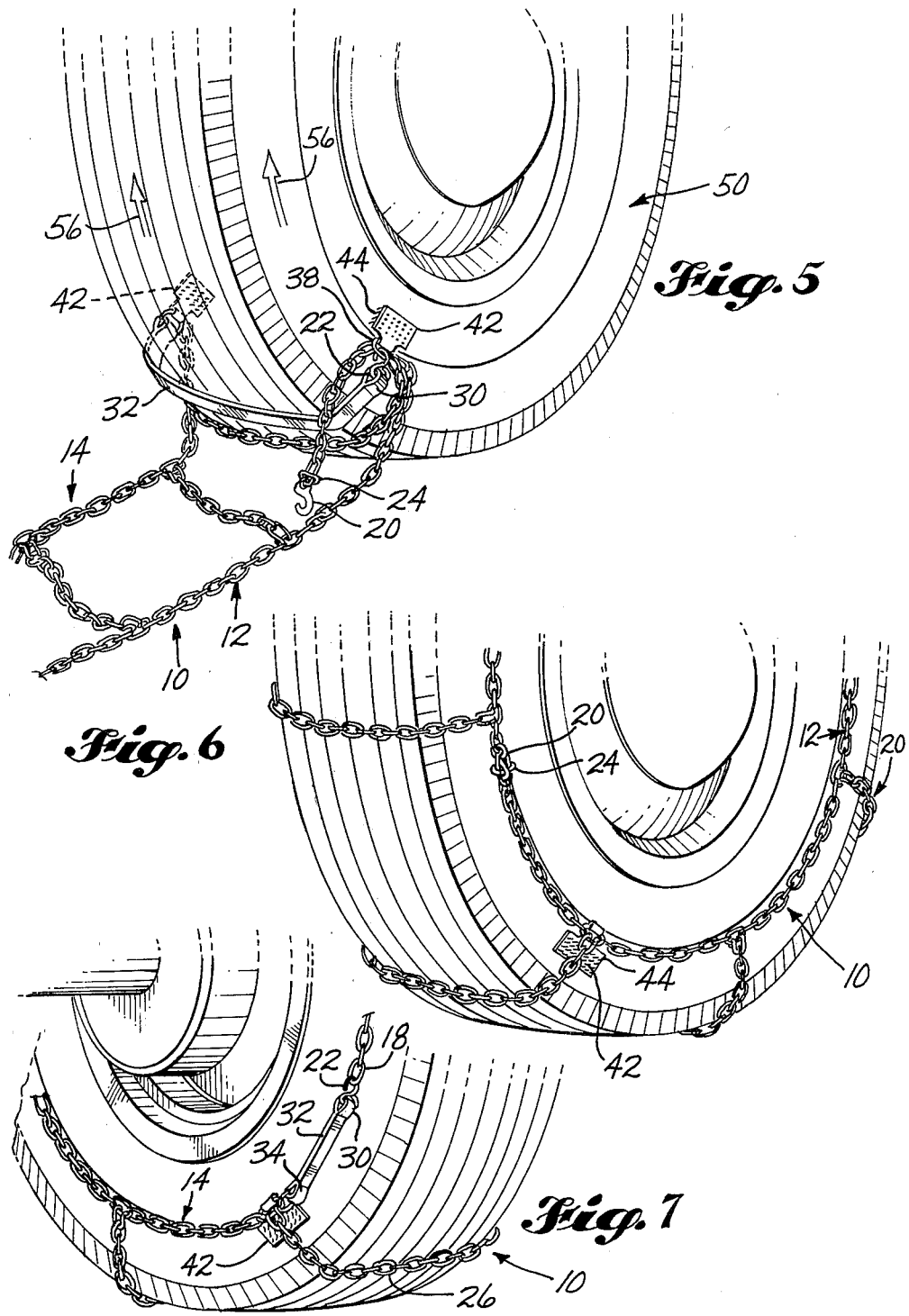

TIRE CHAIN WITH ATTACHING DEVICE

DESCRIPTION

1. Technical Field

The invention relates to tire chains and to devices for initiating attachment of the tire chain to a tire mounted on a vehicle, particularly when the tire is bearing on a road surface.

2. Background Art

Tire chains are difficult to secure on tires mounted on a vehicle when the tire has a bearing on a road surface. A search of the patent literature discloses a number of devices for facilitating the application of a tire chain to a mounted tire, but none of the patents found suggest the present invention. The patents found in the seach are as follows:

U.S. Pat. No. 1,571,764 C. Edwards
U.S. Pat. No. 1,666,397 J. L. Piatt
U.S. Pat. No. 1,806,840 J. S. Campbell
U.S. Pat. No. 1,914,760 A. L. Stiles
U.S. Pat No. 2,076,894 J. R. Johnson
U.S. Pat. No. 2,166,869 R. E. Lees et al.
U.S. Pat. No. 2,177,279 M. Holub
U.S. Pat. No. 2,213,910 T. W. Higgins et al.
U.S. Pat. No. 2,484,714 C. F. Kapp
U.S. Pat. No. 2,834,391 S. M. Hellman
U.S. Pat. No. 2,707,015 M. F. Rickenback
U.S. Pat. No. 2,715,429 H. A. Rockel
U.S. Pat. No. 2,857,136 J. H. Thomas
U.S. Pat. No. 2,925,843 W. N. Cox
U.S. Pat. No. 3,303,728 J. E. Webb et al.

DISCLOSURE OF THE INVENTION

The invention is an improvement in a tire chain including a resilient strap which forms one end of the portion of the chain which is adapted to be secured along the inside wall of a tire. When the chain is not secured to a tire, the strap has a free end having a hook adapted to be connected to the other end of the inside chain. The other end of the strap is permanently secured to the chain and where it is so secured, there is an adjacent link carrying a plate having a plurality of sharply pointed hooks or barbs. On the other side of the chain, adapted to be on the outside of the tire, there is an identical plate having said barbs.

Plates carrying the barbs and the resilient strap are adapted to be used in facilitating the initial mounting of the anti-skid chain on a tire mounted on a vehicle and bearing on a road surface.

In using the invention to apply the chain to the tire, the free end of the strap is hooked on to the link carrying the plate on the other side of the chain. The strap will then be in a position to be stretched across the tread of the tire. The plate carrying the barbs on the inside portion of the chain is positioned so that the barbs are directed into the tire and toward the treaded circumference. From the outside of the tire, the strap is stretched so as to pull the barbs into the tire on the inside and at the same time the outside plate is pressed against the tire with the barbs into the tire and in the direction of the tire circumference. Thus, when the strap is released, it will retract and tighten the barbs and plates on the tire so as to hold the chain on both sides, adjacent the plates, on the tire.

The wheel is then rotated 360 degrees so as to move the remainder of the chain onto the tire and until the respective ends of the chain are in position for connection and final securing on the tire. When the chain is so positioned, the strap is disconnected from the outside of the tire and moved to the inside where it is connected to the other end of the chain in a permanent biasing attachment. Before the chain is finally secured to the tire, the plates carrying the barbs are rotated on the chain so as to be moved thereunder with the barbs directed outwardly, to secure the plates against flapping movement during the driving of the vehicle with the chain thereon.

Accordingly, it is an object of the invention to provide a chain having a resilient strap and adjacent temporarily attachable barbs for securing the chain initially to a mounted tire. The advantage of this arrangement is that the barbs may be positioned on the tire against the side walls in convenient locations, and then the strap is stretched a small amount while the barbs are held in place. When the pull on the strap is released, it acts to tightly engage the barbs into the side walls of the tire, but because the barbs are not long or large, they will not cause any damage to the tire although they do provide a sure grip.

Further objects of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 1 is a fragmentary plan view of an anti-skid tire chain according to the invention;

FIG. 2 is a cross sectional view of a tire with the chain in the process of being secured to the tire, the securing being facilitated by the invention;

FIG. 3 is a fragmentary pictorial view of a portion of chain, illustrating plates carrying hooked barbs for temporarily and initially securing the chain to the tire;

FIG. 4 is a pictorial view of a resilient strap on the chain, according to the invention including a variation from that shown in FIG. 1;

FIG. 5 is a pictorial view of the position of the chain as it is being initially applied with the aid of the invention;

FIG. 6 is a view of the outside of the tire and chain, the chain being secured on the tire for operation; and FIG. 7 is a view of the chain as finally secured on the inside of the tire in accordance with the invention.

BEST MODE FOR CARRYING OUT THE INVENTION

Referring again to the drawings, there is shown in FIG. 1 an anti-skid tire chain generally designated as 10. The chain is comprised of an outside row of links 12 and an inside row of links 14, each of the rows at the lower part of the drawing having an end link 16 and 18, respectively, adapted to be joined by a locking hook 20, and an open biased-hook 22 at the other ends of the chain at the top of the figure. The hook 20 has a locking link 24 adapted to fit over the hook and the link 16 to lock the two together. Extending between the inside wall chain 14 and the outside wall chain 12, substantially perpendicular thereto, are a plurality of transverse anti-skid chains 26.

The hook 22 is secured to a closed loop 30 on one end of resilient strap 32, the other end of the strap also having a closed loop 34 engaged with a ring 36 attached to inside chain link 38. Strap 32 is preferably made of a elastomeric material so as to provide a strong biasing connection as indicated in FIG. 7 where the inside row of links is held tightly together by the bias of the strap.

As best seen in FIGS. 1 and 3, links 38 on both sides of the chain are engaged with a metal sleeve 40 from which extends a metal plate 42. The metal plates 42 have a plurality of sharply pointed hooks or barbs 44 extending therefrom.

As indicated in FIG. 5, in order to initiate the securing of the chain on a tire 50, mounted on a wheel, the tire tread circumference bearing on a road surface, the hook 22 is engaged with the link 38 on the outside portion 12 of the chain, as shown in FIGS. 2 and 5. The plate 42 on the inside portion 14 of the chain is then pressed against the inside wall of the tire at a convenient location so that the barbs 44 extend inwardly and downwardly toward the tread, FIG. 2. The strap 32 is then stretched across the tread to the outside wall of the tire and the plate 42 on the outside chain portion 12 is pressed against the tire so that the barbs engage this surface with the points extending toward the tread. During the stretching of the strap both plates are held against the tire and the stretching biases the plates so that the barbs engage the tire. When the plates are released, the strap further tightens the plates on the tire and pulls the barbs inwardly into the tire so as to secure the plates and the chain, as shown in FIG. 5, on the tire. The barbs 44 do not enter the tire sufficiently to do any damage.

The tire is then ready for rotation in the direction of the arrows 56. The tire is so rotated by moving the vehicle forwardly until the chain extends fully around the tire and the loose ends 16 and 18 and the hooks 20 and 22 are adjacent each other for respective connection in the approximate position of the tire, as shown in FIG. 5. The barbs 44 are then disengaged from both sides of the tire and the sleeves 40 are rotated on the links 38 so as to be positioned with the barbs extending outwardly and with the plates 42 extending under a transverse chain portion 26 adjacent the links 38. This positions the plates so that they will be secured against the side walls of the tire.

The chain is then adjusted on the tire as necessary by pulling the ends together and the hook 22 is disengaged from the link on the outside of the tire and connected to the link 18 on the inside of the tire, FIG. 7, to secure the chain along the inside wall. Similarly, the hook 20 is engaged with the link 16 on the outside wall and the locking link 24 is slipped over the hook and the link 16 to lock the hook 20 in place. The hook 22 is not locked because the bias of the strap 32 tightly holds the chain ends together on the inside of the tire. If the chain is too long for a proper fit, the hooks 20 and/or 22 may be connected to links inwardly of the links 16 and 18.

In FIG. 4 there is a variation in the structure surrounding the strap 32. Slidably engaged on the strap is a pulling or stretching ring 60. At one end of the strap the closed loop 30 has an enlarged closed loop 62 engaged therein to prevent the ring 60 from sliding off of the strap. An open hook 64 extends outwardly from the loop 62. At the other end of the strap, there is a ring 36, the same size as that shown in FIG. 1 and the ring 60 is retained on the strap by the positioning of the sleeve 40 on the link 38. The purpose of the ring 60 is to aid in pulling the strap, as shown in FIG. 5, toward the outside of the tire in the stretching process. Sometimes a strap 32 will tend to stick along the tire, and if the ring is moved from the inside of the tire along the tread to the outside, this movement will loosen the strap and make it easier to fully stretch on the tire as desired, so as to position the outer plate 42 on the outside wall of the tire.

The invention and its attendant advantages will be understood from the foregoing description and it will be apparent that various changes may be made in the forms, construction, and arrangements of parts of the invention without departing from the spirit and scope thereof or sacrificing its material advantages, the arrangements hereinbefore described being merely a way of example. I do not wish to be restricted to the specific forms shown or uses mentioned, except as defined in the accompanying claims.

I claim:

1. An anti-skid tire appliance adapted to be installed onto and removed from a vehicle tire, comprising:
    a first elongated flexible side member adapted to extend circumferentially of the tire along the outer sidewall of the tire;
    a second elongated flexible side member adapted to extend circumferentially of the tire along the inner sidewall of the tire;
    a series of spaced apart cross members, connected at their ends to the side members and extending laterally across the tread of the tire, from one side member to the other;
    said appliance having first and second ends;
    each said side member having ring means at the first end of the appliance;
    each said side member having an end portion at the second end of the appliance which extends outwardly beyond the end-most cross member at the second end of the appliance;
    each said end portion having a hook at its outer end engageable with the ring means at the first end of the appliance, for securing the two ends of the appliance together and the appliance on the tire;
    a first sidewall gripping member at the second end of the appliance, connected to the first side member adjacent said end-most cross member;
    a ring adjacent said first sidewall gripping member;
    a second sidewall gripping member at the second end of the appliance, connected to the second side member of the appliance adjacent said end-most cross member;
    each said sidewall gripping member comprising sharply pointed members adapted to dig into and grip a sidewall portion of the tire when placed against such sidewall portion and pulled on towards the tread; and
    said end portion of said second side member extending outwardly from the second sidewall gripping member and being constructed from an elastic material, and being adapted to be extended across the tire and stretched, to engage the hook at its end onto the ring means adjacent the first tire gripping member, so that when stretched said elastic end portion will exert a drawing force on the two tire gripping members, in the direction of the tread, for forcing the sharply pointed members into gripping engagement with the sidewalls of the tire.

2. The invention of claim 1, wherein the first elongated flexible side member is a length of link chain and the second elongated side member comprises said elastic end portion and a length of link chain extending therefrom to the first end of the appliance.

3. The invention of claim 2, wherein said sidewall gripping members are pivotally attached to chain links at the respective sides of the appliance.

4. The invention of claim 1, comprising grip means engaging said elastic end portion which is easily graspable and is adapted to be gripped and pulled upon for stretching the elastic end portion.

5. The invention according to claim 4, wherein said means for pulling the elastic end member is generally a ring-shaped member slidable on said elastic end member.

* * * * *